Patented Nov. 27, 1934

1,982,542

UNITED STATES PATENT OFFICE 1,982,542

TREATED FIBROUS MATERIAL AND PROCESS OF MAKING THE SAME

William R. Seigle, Mamaroneck, N. Y., assignor to Johns-Manville Corporation, New York, N. Y., a corporation of New York No Drawing. Application March 5, 1932, Serial No. 597,096

5 Claims. (Cl. 91—68)

This invention relates to a treated fibrous material and process of making the same, and particularly to a product suitable for use as a thermal insulator. The invention pertains especially to a product comprising fibers and inorganic material of basic properties precipitated in intimate association with the fibers. A preferred embodiment of the invention is a thermal insulating material comprising approximately 15 parts by weight of asbestos fibers and 85 parts of basic magnesium carbonate, the latter being precipitated in intimate association with the asbestos fibers and retained in situ and suitably precipitated in part within the fibers.

An object of the invention is to produce a fibrous material containing an alkaline earth metal compound, of basic properties and low density, precipitated and imbedded within the fibers. A further object is to produce so-called 85% magnesia insulation of abnormally high strength in proportion to its density. Other objects and advantages will appear from the detailed description that follows.

The term 85% magnesia is applied to a thermal insulating material comprising approximately 15 parts by weight of asbestos and 85 parts of precipitated basic magnesium carbonate.

The conventional process of making 85% magnesia comprises the following steps. There is prepared a solution of magnesium bicarbonate in water that is saturated with carbon dioxide gas at a pressure that is suitably atmospheric or higher. Usually the solution contains 1.4 to 2.0% by weight of dissolved magnesia calculated as magnesium bicarbonate. Thus it is customary to prepare magnesium bicarbonate solutions containing approximately 1.6 per cent of total solids as determined by the evaporation of a portion of the solution. Such a solution of carbonate is herein referred to as concentrated, in distinction from the low concentration of dissolved magnesia compound present in a solution after it has been boiled to expel carbon dioxide or present in a solution in water that is not rich in carbon dioxide.

The solution of magnesium bicarbonate in water containing carbon dioxide is then submitted to a treatment to expel carbon dioxide and cause conversion of the dissolved magnesium bicarbonate to precipitated basic magnesium carbonate. This treatment usually comprises boiling, by which is meant raising the temperature of the solution to such a point that carbon dioxde gas escapes and basic magnesium carbonate is precipitated. The temperature of boiling will vary with the stage of the boiling process, being relatively low at first and then increasing to approximately the boiling point of water when most of the carbon dioxide has been expelled. At the end of the boiling process most of the magnesia content of the solution will have been precipitated, in the form of basic magnesium carbonate which comprises magnesium and hydroxyl and carbonate groups.

It is conventional to mix the precipitated basic magnesium carbonate with the desired proportion of asbestos fibers and then to submit the mixture to a shaping and partial dehydrating operation. This shaping and dehydration may be effected by forcing the wet mixture or slurry, by air or pump pressure, into a filter-mold, that is, a mold with filtering sides adapted to permit outflow of water. The solid material is retained within the filtering sides of the mold. With molds of desired shape of interior, it is thus possible to mold a filter cake or block of the shape desired, as, for example, of semi-tubular shape adapted for use as covering for steam pipes. The cake or block is molded at a selected pressure applied by means of the pump which feeds the mixture to the mold. Following the molding operation, the molded article is removed and finished in steps which include drying and then sizing to the exact dimensions and form desired, as by sawing or cutting.

There are certain difficulties encountered in manufacturing 85% magnesia by this conventional process. For example, it is difficult to make a product of as low density and as high thermal insulating properties as desired without decreasing the strength of the article to an undesired degree. In other words, strength is related to density and insulating power in such manner that it is difficult to make a very strong block that is not so heavy as to show undesirable thermal conductivity. It will be understood that thermal insulating power is related to density, in that thermal conductance depends in part upon the amount of matter present for conducting heat. Other things being equal, the transfer of heat in the particular manner known as conduction is lower for a given class of insulating material at lower densities of the insulating material.

Adding to the importance of this relation between strength and density is the fact that some buying specifications require a minimum strength for any given density of the insulation. These specifications have been difficult to meet, regularly and consistently, in factory production by the conventional process.

I have now discovered a means of making an 85% magnesia article that is relatively lighter in weight and stronger than when made by the conventional process.

My novel process may be illustrated by the following example which illustrates one method of practicing the invention. Into a concentrated solution, of the type described, of magnesium bicarbonate in water containing carbon dioxide there is introduced 15 parts by weight of asbestos fibers, of quality commonly used in making 85% magnesia, for each 85 parts by weight of basic magnesium carbonate recoverable from the solution. After the asbestos fibers are admixed with the magnesium bicarbonate solution and after sufficient time, say 20 minutes or longer, has been allowed for the magnesia solution to penetrate within the units or fibers of asbestos, the mixture is submitted to boiling to expel the carbon dioxide gas and cause precipitation of basic magnesium carbonate. The basic magnesium carbonate is thus precipitated in intimate association with the asbestos fibers, not only immediately around the asbestos fibers but also in substantial proportion within the fibers. The resulting mixture is then pumped to a mold with filtering sides, where a filter cake or shaped block is formed, suitably at an hydraulic pressure of 30 to 75 pounds gauge per square inch. When the mold is filled with the mixture of asbestos and basic magnesium carbonate the pressure is released, as by turning a valve in the line which feeds the mixture from the pump to the mold, the shaped and partially dehydrated article is removed from the mold, and the product is dried and finished in a conventional manner.

The finished article resembles 85% magnesia in appearance, but has unique properties, which vary somewhat with the conditions of manufacture. Thus the pressure under which the mass is shaped in the filter-mold affects the density of the block and also the breaking strength, or modulus of rupture. Blocks weighing approximately 12 to 13 pounds per cubic foot have a modulus of rupture that is not substantially below 60 pounds and may be 75 to 80 pounds.

The following table illustrates the properties of typical 85% magnesia blocks made in accordance with the present invention, at several different pressures of molding.

*Properties of improved 85% magnesia insulation*

| Molding pressure, pounds gauge pressure per sq. in. | Weight of dried finished product, pounds per cu. ft. | Modulus of rupture finished product |
|---|---|---|
| 15 | 9.1 | 34.4 |
| 30 | 10.8 | 50.0 |
| 52 | 12.1 | 59.9 |
| 60 | 12.4 | 74.6 |
| 75 | 13.1 | 79.5 |

As indicated, the conditions of manufacture affect the properties of the finished 85% magnesia. For this reason, comparable preparations were made by the novel process and by the conventional process. The materials and the methods of preparation used were identical in the two cases, except that, in the one series of preparations, there was used the improved process of mixing the asbestos fibers with the magnesium bicarbonate solution and allowing the fibers to soak in the solution before the solution was boiled, whereas, in the other series, there was used the conventional process in which the asbestos fibers were mixed into the previously precipitated basic magnesium carbonate. The results with the improved process have been given in the table above. Results with the conventional process are given in the table that follows.

*Properties of 85% magnesia insulation made by the conventional process*

| Molding pressure, pounds gauge pressure per sq. in. | Weight of dried finished product, pounds per cu. ft. | Modulus of rupture finished product |
|---|---|---|
| 15 | 11.4 | 35.4 |
| 25 | 12.4 | 46.3 |
| 45 | 14.0 | 63.1 |
| 55 | 14.2 | 67.0 |
| 65 | 15.0 | 86.1 |

Comparison of the data in the two tables, especially by plotting graphs showing (1) the relation of molding pressure to the weight of the finished product per cubic foot and (2) the relation of the weight per cubic foot to the modulus of rupture, shows differences in the two products and especially that, for a given weight per cubic foot, the product made by the improved process has a considerably higher modulus of rupture.

The term fibers as used herein should be understood to mean units of the product into which and/or around which the precipitated material is imbedded. Thus, the term asbestos fibers is intended to cover the visible units of asbestos that has been well carded or disintegrated, according to commercial practice. Such units contain each a multiplicity of small crystals which are smaller than the units designated by the term fibers, as used by me.

While the invention is not limited to any theory or explanation of the useful results obtained, the following comment may be of interest as possibly explaining in part the reason for the improvement produced by incorporating the asbestos fibers into the magnesium bicarbonate solution and soaking them, as described, before the solution is boiled. In the first place, concentrated magnesium bicarbonate solutions may have a swelling action upon asbestos fibers, the property of loosening the individual crystals comprising a fiber, somewhat as soaking a book in water causes the pages to separate, and/or a coagulating action that gives to the fibers a slick feeling and, after molding, increased adherence. The swelling may be due largely to a coagulation of colloidal matter or to other effects produced by the magnesium bicarbonate solution upon the aggregation of crystals which composes the fiber of asbestos. In the second place, the basic magnesium carbonate is precipitated, in the improved process, in intimate association with or within asbestos fibers and is retained by the asbestos fibers in part in situ, that is, where the precipitation occurs. Another possible explanation of the result of mixing the asbestos fibers into the solution of magnesium bicarbonate, before the latter is boiled, is the penetration of the liquor within the asbestos fiber and between the individual crystals constituting the fiber, followed by the precipitation of solid material within such fiber, when the solution is boiled. The precipitation of the magnesia within the fibers is succeeded by more or less crystallization which may result in interlocking of the resulting crystals of basic magnesium carbonate with the crystals of asbestos. This interlocking may account in part for the increased strength or modulus of rupture observed in 85% magnesia made by the improved process. Also, the growth of crystals of basic magnesium carbonate between the asbestos crystals may push the asbestos crystals apart and leave some voids which serve to decrease the density of the finished product.

Many variations from the illustrative details given may be made.

Before the precipitation of a basic compound of an alkaline earth metal within the asbestos fibers, the fibers may be swollen or treated with a solution containing some other compound than magnesium bicarbonate. Thus, there may be used another compound of a multivalent metal, as, for example, magnesium chloride, aluminum sulfate, or a weakly alkaline material such as an aqueous mixture containing lime. For example, asbestos fibers may be treated with an aqueous mixture or solution of lime at a temperature not substantially above the boiling point of the solution at atmospheric pressure, a part of the excess of lime solution removed from the treated fibers, as by draining or centrifuging, and the resulting fibers mixed with a solution of magnesium bicarbonate. Boiling is then produced, whereupon basic magnesium carbonate is precipitated within the previously swollen or treated fibers.

Also, the proportions of asbestos to magnesia may be varied in accordance with the hardness and other properties desired in the finished product. For example, from 5 to 20 parts of asbestos may be used for each 100 parts by weight of the finished block.

The length of time of soaking the asbestos fibers in the magnesium bicarbonate solution before the latter is boiled may be varied. In typical preparations there have been used soaking periods of 20 minutes to 3 hours. A length of time that gives satisfactory results without excessive delay in factory production is 30 minutes to 90 minutes, preferably approximately 1 hour.

The temperature of soaking is suitably 60 to 140° F., preferably 100 to 140° F.

From the first table above, giving data for the mixture of asbestos and basic magnesium carbonate, precipitated in intimate association with the asbestos, it is seen that the mixture may be molded or shaped at various pressures from 15 to 75 pounds per square inch. These are the gauge pressures, that is, pressures above atmospheric. In general, it has been found desirable in my process to use pressures that are relatively high, suitably 60 to 75 pounds per square inch. Molding at such pressures increases the modulus of rupture without causing a greater density of product than is allowable.

A further modification of the process that has been successfully used is one in which the asbestos fiber is soaked, for the desired length of time, in a portion only, say a fourth, of the total required magnesia liquor. The soaked fiber and liquor used are then mixed with the remaining magnesia liquor, as during the transfer of the materials to the boiling kettles, and the whole mixture is then boiled. Molding and finishing are then performed in the manner described above.

The shaping of the sludge or slurry of basic magnesium carbonate precipitated in intimate association with asbestos fibers may be made in a usual manner. Thus, to make a flat block of 85% magnesia, the sludge may be pumped into a dewatering device resembling a filter press, in which solid cakes are built to occupy the space between adjacent filter members. Or the shaping may be done, as stated, in a filter-mold of special shape. For example, the shape of the cavity in the mold, into which the sludge is forced and in which a cake or molded article is formed, may be approximately that of a half section of tubular pipe covering. When such sections are finished and sized, as by cutting or sawing, to the more or less exact dimensions and form desired, the two finished sections may be joined at their side edges, to form a hollow cylinder adapted to be fitted around a steam pipe or other tubular object that is to be insulated against loss of heat.

While asbestos fibers have been found particularly useful for the purpose of the present invention, various other fibers may be substituted for the asbestos in the compositions and process described. When resistance to relatively high temperatures is not required, the fibers used may be organic, as, for example, hemp, jute, or wool. The various fibers may be used alone or mixed with asbestos fibers. However, asbestos fibers are particularly suited to the purpose of the present invention; these fibers give all the desired features of swelling with the magnesium bicarbonate solution and/or interlocking with the crystals of basic magnesium carbonate and, in the resulting product, lightness, the preferred texture, and freedom from charring or carbonizing when used to insulate a steam pipe.

For certain special purposes these fibrous materials may be used in sheet form, as, for example, in the form of felted or woven fibers. Such sheets may be soaked in a solution of magnesium bicarbonate and then treated to precipitate basic magnesium carbonate within the sheet, as by warming. An illustrative example of the treatment of a sheet of fibrous material follows.

A woven fabric of loosely spun fibers of wool is passed through a solution of magnesium bicarbonate in water in equilibrium with carbon dioxide at approximately atmospheric pressure. During this passage the fabric becomes impregnated with the solution of magnesium bicarbonate. The impregnated fabric is then passed through a warming chamber in which there is expelled carbon dioxide, to cause precipitation of the basic magnesium carbonate within the fabric. The fabric containing the imbedded magnesium basic carbonate is then submitted to drying.

In another example, a woven fabric of asbestos fibers loosely spun around small reenforcing brass wires is immersed in a solution of magnesium bicarbonate in water containing carbon dioxide. The thus impregnated fabric is submitted to a warming operation to expel carbon dioxide and cause precipitation of basic magnesium carbonate within and between the fibers of asbestos. The resulting product is then dried.

When the fibers are loosely assembled, to give a highly absorptive fabric, it is possible to produce a finished product in which the proportion of imbedded precipitate to fiber is larger than when tightly assembled fibers are used.

Felts of wood pulp or wool fibers may be similarly impregnated and finished, care being taken that the felted products are not disintegrated during the soaking process. The soaking process as applied to felted wood pulp, for example, should be of very short duration and be followed promptly by warming.

In place of the precipitated basic magnesium carbonate which has been used in the illustrative examples and discussion above, there may be provided some other precipitated alkaline earth metal compound of basic properties. Thus, an insoluble alkaline earth metal compound of basic properties may be provided by chemical reaction between two water soluble compounds. For example, a fibrous material may be impregnated with a solution of magnesium sulfate or magnesium bicarbonate which, in turn, may be treated with sodium carbonate or sodium hydroxide. In the one case the precipitate formed is magnesium carbonate, and, in the latter case, is magnesium hydroxide. The choice of imbedded insoluble alkaline earth metal compound of basic properties depends in part upon the properties desired in the finished product. For light-weight thermal insulation, the precipitate of magnesium hydroxide or basic carbonate is preferred.

By basic properties is meant the property of neutralizing an acid without leaving behind another non-volatile acid. The properties of a material such as basic magnesium carbonate or magnesium hydroxide are to be distinguished from the properties of such a compound as magnesium silicate, for example, which, on reacting with an acid, produces, as one product, silicic acid.

Since many variations from the details given may be made without departing from the scope of the invention, it is intended that the invention should be limited only by the terms of the claims.

What I claim is:

1. In making an intimate mixture of a fibrous material of the type of asbestos and basic magnesium carbonate, the method which comprises soaking the fibrous material in a concentrated aqueous solution of magnesium bicarbonate, to cause impregnation of the fibers, at a temperature not substantially above 140° F., and then boiling the resulting mixture, to precipitate basic magnesium carbonate within the fibrous material.

2. In making an intimate mixture of asbestos fibers and basic magnesium carbonate, the method which comprises mixing asbestos fibers with a concentrated aqueous solution of magnesium bicarbonate, allowing the fibers to remain in contact with the solution for not less than approximately twenty minutes, to cause impregnation and swelling of the fibers, and then boiling the mixture, to expel carbon dioxide and precipitate basic magnesium carbonate within the fibers.

3. In making an intimate mixture of asbestos fibers and basic magnesium carbonate, the method which comprises soaking asbestos fibers in an aqueous solution of material adapted to cause swelling of the fibers, impregnating the fibers with a concentrated aqueous solution of magnesium bicarbonate, and boiling the resulting mixture, to cause precipitation of basic magnesium carbonate within the fibers.

4. A lightweight article of manufacture comprising asbestos fibers and a substantial proportion of basic magnesium carbonate precipitated within the individual fibers, substantially identical with the product resulting from following the method described in claim 2.

5. An article of manufacture comprising fibers of the type of asbestos and a basic compound of magnesium precipitated in substantial proportion within the individual fibers.

WILLIAM R. SEIGLE.